United States Patent [19]

Addison

[11] 3,956,529

[45] May 11, 1976

[54] FINISHING PROCESS FOR FABRIC COVERED AIR FRAME STRUCTURE

[75] Inventor: Earl H. Addison, La Grange, Ill.

[73] Assignees: Cooper Aviation Industries, Inc., Elk Grove Village; Hydrosol, Inc., Cicero, both of Ill.

[22] Filed: Oct. 25, 1973

[21] Appl. No.: 409,384

[52] U.S. Cl. .............................. 427/171; 244/126; 244/133; 427/381; 427/382; 427/412
[51] Int. Cl.² ....................... B05D 1/38; B64C 1/00
[58] Field of Search ....... 117/76 T, 73, 80, 138.8 F, 117/7; 244/126, 133; 427/171, 381, 412

[56] References Cited
UNITED STATES PATENTS

| | | | |
|---|---|---|---|
| 2,167,414 | 7/1939 | Billing | 244/133 |
| 2,336,266 | 12/1943 | Lester | 244/133 X |
| 2,356,927 | 8/1944 | Grossman | 244/133 |
| 2,431,745 | 12/1947 | Flanagan | 117/76 T X |
| 2,517,852 | 8/1950 | Dreyling et al. | 244/133 X |
| 3,067,484 | 12/1962 | Rasero et al. | 117/76 T |
| 3,140,846 | 7/1964 | Lott | 244/133 |
| R18,355 | 2/1932 | Carson | 244/133 X |

Primary Examiner—Ralph Husack
Attorney, Agent, or Firm—Bruno J. Verbeck

[57] ABSTRACT

A method of finishing cloth-covered aircraft wings and fuselage. The cloth, cotton or polyester cloth of the type made from monofilaments of the condensation product of ethylene glycol with terephthalic acid or dimethyl phthalate is, after application thereof onto the airframe, coated with a layer of latex and dried, then coated with a second, or intermediate, layer of different coating and dried, and then coated with a decorative coating material. The use of latex as a first coat on the cloth results in substantial savings in labor and time and results in a coated fabric of superior flexibility integrity and durability.

4 Claims, No Drawings

FINISHING PROCESS FOR FABRIC COVERED AIR FRAME STRUCTURE

BACKGROUND OF THE INVENTION

The present invention pertains to a novel method, technique, and system for coating aircraft fabrics characterized in part by a substantial reduction in the number of coats and in the time involved in the coating process, (and resulting in a finished composition of improved durability and integrity.)

By way of background, it is pointed out that the air frams, e.g. wings and fuslage of light aircraft are, as has been the practice for many years, conventionally covered with cloth, this being done because of the low cost and ease of fabrication and repair involved. In the early days, special grades of cotton were used; after covering the wings or fuselage with such cloth, the cloth was coated by means of multiple applications of nitrocellulose dope. The nitrocellulose dope used was a solution of a high viscosity, high molecular weight nitrocellulose in organic solvents to provide enough strength and shrinking power to tauten the cloth. The concentration of the nitrocellulose in the dope was usually not more than 10% by weight, beacause of the high viscosity that such nitrocellulose imparted to its solutions. Because of such low concentration, five to eight coats of clear dope, followed by two coats of aluminized dope, and three or more coats of pigmented dope were required in oreder to achieve a sufficient buildup. This technique was not only expensive and time-consuming, but dangerous as well, because of the high flammability of nitrocellulose. While lower flammability was later achieved by substitution of cellulose acetate butyrate for the nitrocellulose, it was still necessary to use an undesirably high number of applications to get the necessary buildup.

In more recent times, the use of cotton fabric for air frame covering has been replaced to a significant extent by the use of smooth filament, heatshrinkable polyester fabric of the type commonly termed Dacron, a product of the DuPont Company of Wilmington, Del.

After application of the fabric to an airframe or part thereof, the fabric is tautened by application of heat. While this type of fabric is superior to cotton in its resistance to weathering and to biological or chemical attack, it is difficult to obtain good adhesion of finishing coats thereto, when nitrocellulose or acetate butyrate dope is used as the prime and finishing coats, and such coats have tended to pull away from the fabric substrate rather readily.

SUMMARY OF THE INVENTION

The present invention is directed to the provision of a new and unique method for producing an integrated, multi-coat aircraft fabric on the wings of fuselage of an aircraft, which method significantly reduces the number of coats needed, and the time and labor required in the coating process.

In carrying out my process, I apply a prime coating comprising latex polymers to smooth filament, heatshrinkable polyester fabric of the type above-described after the fabric has been shrunk onto the air frame or air frame part. This coating comprises high molecular weight molecules, of substantial strength and flexibility, in latex form, at a solids content of up to 45%. This solids content compares to a practically useable nitrocellulose or cellulose acetate butyrate solution maximum solids content of no more than 12%. Thus one coat of such a latex will replace and give the buildup equal to three or four coats of traditional solution dopes.

A suitable latex component of the prime coating used in the practice of my invention is represented by the acrylic latex available from the Rohm and Haas Company of Philadelphia, PA., under the trade name of Rhoplex AC-22. This is a medium-viscosity water dispersion of a flexible acrylic polymer, having a high pigment binding capacity and permitting excellent pigment wetting. The latex is also characterized by its stability in the presence of calcium ions, i.e., no coagulation occurs when it is mixed with an equal volume of a 10% calcium chloride solution.

One or more layers of a composition comprising such latex, in a suitable formulation, is first applied to the fabric by any conventional means such as spraying, brushing or the like.

The acrylic latex has outstanding adhesion to the polyester cloth and flexibility and strength comparable to the cloth itself, so that once the prime coat is applied to the cloth and dried, the cloth and coating become inseparable and stronger than either cloth or acrylic by itself. At this point the aircraft is completely airworthy and succeeding coatings are applied for purposes of decoration and smoothness.

Many latices are commercially available which might accomplish a similar result based on styrene butadiene, vinyl acetate or many other polymers I find, however, the AC22 latex used gives the best results.

After drying, there may be applied thereover one or more intermediate coating layers of a second coating composition containing inter alia, nitrocellulose, cellulose acetate butyrate, butyl benzyl phthalate, and aluminium flake, The components of this intermediate coating are dissolved (except for the aluminum flake which remains in suspension) in suitable solvents so that the composition may be applied by any conventional method such as brushing, rolling or spraying.

The resulting coated fabric is then ready, after drying, for the application of any decorative top or finishing coat, containing preferably cellulose acetate butyrate ast the film-former, plasticizer and pigment dissolved in an organic solvent, or a combination of cellulose acetate butyrate with acrylic resins, with the desired color or colors added, including a combination of cellulose acetate butyrate, methyl methacrylate polymer or copolymer, plasticizer and pigment dissolved in an organic solvent. Any suitable decorative topcoating may be used such as vinyl chloride or alkyd resin; however, we find such topcoats do not have the best flexibility or durability.

DESCRIPTION OF A PREFERRED EMBODIMENT:

In further describing my invention in terms of a specific example, it is to be understood that this is done to fully comply with the requirements of 35 U.S.C. paragraph 112, and that that specific example is not intended to limit the invention in any way, since variations within the scope of my invention will readily occur to those skilled in the art.

EXAMPLE 1.

The presently preferred composition of the latex primer coating is as follows, all amounts being in weight percent.

| | |
|---|---|
| AC 22 Acrylic Latex | 50.00 |
| Water | 28.72 |
| Titanium Dioxide | 9.52 |
| Acrysol G110 | 6.84 |
| Propylene Glycol | 4.06 |
| Ethylene Glycol Mono Buty Ether | 0.49 |
| Tamol | 0.29 |
| Super Adit | 0.08 |
| | 100.00 |

The composition is prepared by thoroughly mixing the foregoing components until a homogeneous mix is obtained.

In the above formulation, AC22 Acrylic Latex is a medium-viscosity emulsion of a flexible acrylic polymer manufactured by the Rohm & Haas Company of Philadelphia, PA.

The titanium dioxide is R-CR3 grade; produced by Tioxide America, Inc., Columbia, Md.

Acrysol G110 is an ammonium polyacrylate solution, also produced by the Rohm & Haas Company, and having a non-volatile content of 22.0±0.5%; pH of 8.5 to 9.5; viscosity (5% solids in water) of 90 to 170 cps; and a specidic gravity of 1.06.

Tamol 731 (25) is a pigment dispersant produced by Rohm & Haas Company, and having a solids content of 25±C. (No.2 spindle, 60 rpm) of 65 to 238 cps; pH of 10% aqueous solution of 9.5 to 10.5; and freezing point of −2°C.

Super Adit is a solution containing 21% of di (phenylmercuric) dodecenylsuccinate in an inert hydrocarbon solvent. It has a specific gravity at 80°F. of about 0.965 to 0.985, a viscosity at 80°F. of about 0.2 poises, and a flash point of about 104°F., and is produced by Tenneco Chemicals, Inc., of New York.

The intermediate coating has the following presently prefered composition, in weight percent:

| | |
|---|---|
| Acetone | 36.00 |
| Toluene | 25.26 |
| Butyl Acetate | 21.80 |
| Isopropyl Alcohol | 7.05 |
| Cellulose Acetate Butyrate | 3.87 |
| Nitrocellulose | 3.87 |
| Butyl Benzyl Phthalate | 1.29 |
| Aluminum Flake | .86 | all of the ingredients are thoroughly mixed together in a suitable container until homogeniety is achieved.

The Cellulose Acetate Butyrate is available from the Tennessee Eastman Corp., of Kingsport, Tenn., and is grade EAB-381-20 with a viscosity range of 17–33, average acetyl content of 13.0% and average butyryl content of 37%.

The nitrocellulose is available from Hercules, Inc. of Wilmington, Del., and is Grade RS 15-20, having a viscosity range of 15 to 20 seconds and an average nitrogen content of 12%.

The Butyl Benzyl Phthalate is available from Monsanto Chemical Co., of St. Louis, Mo.

The aluminum flake, available from Alcoa of Pittsburgh, Pa., is standard lining powder No. 408, having an average mesh size of 99% through a 325 mesh screen, and an approximate specific gravity of 2.50.

In my presently preferred method, tow coats of the above described latex primer coating are brushed on the polyester monofilament fabric stretched on the air frame, allowing 2 hours to dry between coats. This is followed by one spray coat of the above described intermediate coating composition, followed by three spray coats of pigmented cellulose acetate butyrate, the latter containing any of the well known pigments available commercially.

While my novel and unique process as above described is applicable to the coating of cotton fabric coverings of air frames, it is particularly and unexpectedly advantageous to the coating of smooth filament heat shrinkable polyester fabrics as referred to above. While such fabrics are superior to cotton fabrics for air frame covering purposes, because such polyester fabrics have substantially better resistance to weathering and to attack by biological and chemical agents, their use has been not as extensive as could be because of the problem posed by the relatively poor adhesion characteristics it has with regard to nitrocellulose or cellulose acetate butyrate containing dope and finish coats applied over the polyester fabric. The use of the acrylic latex emulsions coating or coatings in accordance with my invention has significantly and unexpectedly minimized this heretofore serious problem, while concurrently greatly shortening the total time requred to achieve a substantially improved coated airframe fabric.

While I have described above preferred embodiments of my invention, it will be understood by those skilled in the art that various rearrangements and modifications may be made therein without departing from the spirit and scope of the invention.

The invention claimed is:

1. A method of producing an improved coated aircraft fabric which comprises the steps of first coating a smooth filament heat shrinkable polyester fabric which is tautened onto an air frame with at least one layer of an acrylic latex-containing composition comprising high molecular weight molecules in latex form drying the coating, applying onto said latex coated fabric at least one layer of an intermediate coating composition of a solution dope and drying, and then applying a finishing coat over the layer of said second coating composition, and drying.

2. The method of claim 1 wherein said intermediate coating composition consists essentially of aluminum flake and nitrocellulose, cellulose acetate butyrate and butyl benzyl phthalate dissolved in an organic solvent.

3. The method of claim 1 wherein said finishing coat consists essentially of cellulose acetate butyrate, plasticizer and pigment dissolved in an organic solvent.

4. The method of claim 1 wherein said finishing coat consists essentially of cellulose acetate butyrate, methyl methacrylate polymer or coploymer, plasticizer and pigments dissolved in an organic solvent.

* * * * *